(12) United States Patent
Iandola et al.

(10) Patent No.: US 12,346,816 B2
(45) Date of Patent: *Jul. 1, 2025

(54) NEURAL NETWORKS FOR EMBEDDED DEVICES

(71) Applicant: Tesla, Inc., Austin, TX (US)

(72) Inventors: Forrest Nelson Iandola, San Jose, CA (US); Harsimran Singh Sidhu, Fremont, CA (US); Yiqi Hou, Berkeley, CA (US)

(73) Assignee: Tesla, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,035

(22) Filed: May 14, 2024

(65) Prior Publication Data

US 2024/0296330 A1 Sep. 5, 2024

Related U.S. Application Data

(63) Continuation of application No. 18/156,628, filed on Jan. 19, 2023, now Pat. No. 11,983,630, which is a
(Continued)

(51) Int. Cl.
*G06N 3/08* (2023.01)
*G06F 7/575* (2006.01)

(52) U.S. Cl.
CPC ............... *G06N 3/08* (2013.01); *G06F 7/575* (2013.01)

(58) Field of Classification Search
None
See application file for complete search history.

(56) References Cited

U.S. PATENT DOCUMENTS 6,697,534 B1 2/2004 Tan et al.
6,882,755 B2 4/2005 Silverstein et al.
(Continued)

FOREIGN PATENT DOCUMENTS

AU 2019261735 A1 5/2016
AU 2019201716 A1 10/2020
(Continued)

OTHER PUBLICATIONS

Alippi et al., "Moving Convolutional Neural Networks to Embedded Systems: the AlexNet and VGG-16 case," 2018 17th ACM/IEEE International Conference on Information Processing in Sensor Networks, Apr. 11-13, 2018 (12 pages).
(Continued)

*Primary Examiner* — Steven G Snyder
(74) *Attorney, Agent, or Firm* — Foley & Lardner LLP

(57) ABSTRACT

A neural network architecture is used that reduces the processing load of implementing the neural network. This network architecture may thus be used for reduced-bit processing devices. The architecture may limit the number of bits used for processing and reduce processing to prevent data overflow at individual calculations of the neural network. To implement this architecture, the number of bits used to represent inputs at levels of the network and the related filter masks may also be modified to ensure the number of bits of the output does not overflow the resulting capacity of the reduced-bit processor. To additionally reduce the load for such a network, the network may implement a "starconv" structure that permits the incorporation of nearby nodes in a layer to balance processing requirements and permit the network to learn from context of other nodes.

20 Claims, 7 Drawing Sheets

"StarNet-A" an example StarNet deep neural network architecture

Related U.S. Application Data continuation of application No. 16/559,483, filed on Sep. 3, 2019, now Pat. No. 11,562,231.

(60) Provisional application No. 62/726,396, filed on Sep. 3, 2018.

(56) References Cited

U.S. PATENT DOCUMENTS

| | | |
|---|---|---|
| 7,209,031 B2 | 4/2007 | Nakai et al. |
| 7,643,659 B2 | 1/2010 | Cao et al. |
| 7,747,070 B2 | 6/2010 | Puri |
| 7,904,867 B2 | 3/2011 | Burch et al. |
| 7,953,253 B2 | 5/2011 | Cao et al. |
| 7,974,492 B2 | 7/2011 | Nishijima |
| 8,165,380 B2 | 4/2012 | Choi et al. |
| 8,369,633 B2 | 2/2013 | Lu et al. |
| 8,406,515 B2 | 3/2013 | Cheatle |
| 8,509,478 B2 | 8/2013 | Haas et al. |
| 8,588,470 B2 | 11/2013 | Rodriguez Serrano et al. |
| 8,744,174 B2 | 6/2014 | Hamada et al. |
| 8,773,498 B2 | 7/2014 | Lindbergh |
| 8,912,476 B2 | 12/2014 | Fogg |
| 8,913,830 B2 | 12/2014 | Sun et al. |
| 8,928,753 B2 | 1/2015 | Han et al. |
| 8,972,095 B2 | 3/2015 | Furuno |
| 8,976,269 B2 | 3/2015 | Duong |
| 9,008,422 B2 | 4/2015 | Eid et al. |
| 9,081,385 B1 | 7/2015 | Ferguson et al. |
| 9,275,289 B2 | 3/2016 | Li et al. |
| 9,586,455 B2 | 3/2017 | Sugai et al. |
| 9,672,437 B2 | 6/2017 | McCarthy |
| 9,710,696 B2 | 7/2017 | Wang et al. |
| 9,738,223 B2 | 8/2017 | Zhang et al. |
| 9,754,154 B2 | 9/2017 | Craig et al. |
| 9,767,369 B2 | 9/2017 | Furman et al. |
| 9,965,865 B1 | 5/2018 | Agrawal et al. |
| 10,133,273 B2 | 11/2018 | Linke |
| 10,140,252 B2 | 11/2018 | Fowers et al. |
| 10,140,544 B1 | 11/2018 | Zhao et al. |
| 10,146,225 B2 | 12/2018 | Ryan |
| 10,152,655 B2 | 12/2018 | Krishnamurthy |
| 10,167,800 B1 | 1/2019 | Chung et al. |
| 10,169,680 B1 | 1/2019 | Sachdeva et al. |
| 10,192,016 B2 | 1/2019 | Ng et al. |
| 10,216,189 B1 | 2/2019 | Haynes |
| 10,228,693 B2 | 3/2019 | Micks |
| 10,242,293 B2 | 3/2019 | Shim |
| 10,248,121 B2 | 4/2019 | Vandenberg |
| 10,262,218 B2 | 4/2019 | Lee et al. |
| 10,282,623 B1 | 5/2019 | Ziyaee et al. |
| 10,296,828 B2 | 5/2019 | Viswanathan |
| 10,303,961 B1 | 5/2019 | Stoffel |
| 10,310,087 B2 | 6/2019 | Laddha et al. |
| 10,311,312 B2 | 6/2019 | Yu |
| 10,318,848 B2 | 6/2019 | Dijkman et al. |
| 10,325,178 B1 | 6/2019 | Tang |
| 10,331,974 B2 | 6/2019 | Zia et al. |
| 10,338,600 B2 | 7/2019 | Yoon et al. |
| 10,343,607 B2 | 7/2019 | Kumon |
| 10,359,783 B2 | 7/2019 | Williams et al. |
| 10,366,290 B2 | 7/2019 | Wang |
| 10,372,130 B1 | 8/2019 | Kaushansky et al. |
| 10,373,019 B2 | 8/2019 | Nariyambut Murali et al. |
| 10,373,026 B1 | 8/2019 | Kim |
| 10,380,741 B2 | 8/2019 | Yedla et al. |
| 10,394,237 B2 | 8/2019 | Xu et al. |
| 10,395,144 B2 | 8/2019 | Zeng et al. |
| 10,402,646 B2 | 9/2019 | Klaus |
| 10,402,986 B2 | 9/2019 | Ray et al. |
| 10,414,395 B1 | 9/2019 | Sapp |
| 10,423,934 B1 | 9/2019 | Zanghi et al. |
| 10,436,615 B2 | 10/2019 | Agarwal et al. |
| 10,452,905 B2 | 10/2019 | Segalovitz |
| 10,460,053 B2 | 10/2019 | Olson et al. |
| 10,467,459 B2 | 11/2019 | Chen |
| 10,468,008 B2 | 11/2019 | Beckman et al. |
| 10,468,062 B1 | 11/2019 | Levinson |
| 10,470,510 B1 | 11/2019 | Koh et al. |
| 10,474,160 B2 | 11/2019 | Huang et al. |
| 10,474,161 B2 | 11/2019 | Huang et al. |
| 10,474,928 B2 | 11/2019 | N |
| 10,489,126 B2 | 11/2019 | Kumar et al. |
| 10,489,972 B2 | 11/2019 | Atsmon |
| 10,503,971 B1 | 12/2019 | Dang et al. |
| 10,514,711 B2 | 12/2019 | Bar-Nahum et al. |
| 10,528,824 B2 | 1/2020 | Zou |
| 10,529,078 B2 | 1/2020 | Abreu et al. |
| 10,529,088 B2 | 1/2020 | Fine et al. |
| 10,534,854 B2 | 1/2020 | Sharma et al. |
| 10,535,191 B2 | 1/2020 | Sachdeva et al. |
| 10,542,930 B1 | 1/2020 | Sanchez |
| 10,546,197 B2 | 1/2020 | Shrestha et al. |
| 10,546,217 B2 | 1/2020 | Albright et al. |
| 10,552,682 B2 | 2/2020 | Jonsson et al. |
| 10,559,386 B1 | 2/2020 | Neumann |
| 10,565,475 B2 | 2/2020 | Lecue |
| 10,567,674 B2 | 2/2020 | Kirsch |
| 10,568,570 B1 | 2/2020 | Sherpa |
| 10,572,717 B1 | 2/2020 | Zhu |
| 10,574,905 B2 | 2/2020 | Srikanth et al. |
| 10,579,058 B2 | 3/2020 | Oh |
| 10,579,063 B2 | 3/2020 | Haynes et al. |
| 10,579,897 B2 | 3/2020 | Redmon et al. |
| 10,586,280 B2 | 3/2020 | McKenna et al. |
| 10,591,914 B2 | 3/2020 | Palanisamy et al. |
| 10,592,785 B2 | 3/2020 | Zhu et al. |
| 10,599,701 B2 | 3/2020 | Liu |
| 10,599,930 B2 | 3/2020 | Lee et al. |
| 10,599,958 B2 | 3/2020 | He et al. |
| 10,606,990 B2 | 3/2020 | Tuli et al. |
| 10,609,434 B2 | 3/2020 | Singhai |
| 10,614,344 B2 | 4/2020 | Anthony et al. |
| 10,621,513 B2 | 4/2020 | Deshpande |
| 10,627,818 B2 | 4/2020 | Sapp et al. |
| 10,628,432 B2 | 4/2020 | Guo |
| 10,628,686 B2 | 4/2020 | Ogale et al. |
| 10,628,688 B1 | 4/2020 | Kim et al. |
| 10,629,080 B2 | 4/2020 | Kazemi |
| 10,636,161 B2 | 4/2020 | Uchigaito |
| 10,636,169 B2 | 4/2020 | Estrada et al. |
| 10,642,275 B2 | 5/2020 | Silva et al. |
| 10,645,344 B2 | 5/2020 | Marman et al. |
| 10,649,464 B2 | 5/2020 | Gray |
| 10,650,071 B2 | 5/2020 | Asgekar et al. |
| 10,652,565 B1 | 5/2020 | Zhang |
| 10,656,657 B2 | 5/2020 | Djuric |
| 10,657,391 B2 | 5/2020 | Chen et al. |
| 10,657,418 B2 | 5/2020 | Marder |
| 10,657,934 B1 | 5/2020 | Kolen et al. |
| 10,661,902 B1 | 5/2020 | Tavshikar |
| 10,664,750 B2 | 5/2020 | Greene |
| 10,671,082 B2 | 6/2020 | Huang et al. |
| 10,671,886 B2 | 6/2020 | Price et al. |
| 10,678,244 B2 | 6/2020 | Iandola et al. |
| 10,678,839 B2 | 6/2020 | Gordon et al. |
| 10,678,997 B2 | 6/2020 | Ahuja et al. |
| 10,679,129 B2 | 6/2020 | Baker |
| 10,685,159 B2 | 6/2020 | Su |
| 10,685,188 B1 | 6/2020 | Zhang et al. |
| 10,692,000 B2 | 6/2020 | Surazhsky |
| 10,692,242 B1 | 6/2020 | Morrison et al. |
| 10,693,740 B2 | 6/2020 | Coccia |
| 10,698,868 B2 | 6/2020 | Guggilla |
| 10,699,119 B2 | 6/2020 | Lo et al. |
| 10,699,140 B2 | 6/2020 | Kench et al. |
| 10,699,477 B2 | 6/2020 | Levinson |
| 10,713,502 B2 | 7/2020 | Tiziani |
| 10,719,759 B2 | 7/2020 | Kutliroff |
| 10,725,475 B2 | 7/2020 | Yang et al. |
| 10,726,264 B2 | 7/2020 | Sawhney et al. |
| 10,726,279 B1 | 7/2020 | Kim et al. |
| 10,726,374 B1 | 7/2020 | Engineer |
| 10,732,261 B1 | 8/2020 | Wang et al. |
| 10,733,262 B2 | 8/2020 | Miller et al. |

(56) References Cited

U.S. PATENT DOCUMENTS

| | | | |
|---|---|---|---|
| 10,733,482 B1 | 8/2020 | Lee et al. |
| 10,733,638 B1 | 8/2020 | Jain et al. |
| 10,733,755 B2 | 8/2020 | Liao et al. |
| 10,733,876 B2 | 8/2020 | Moura |
| 10,740,563 B2 | 8/2020 | Dugan |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li |
| 10,755,112 B2 | 8/2020 | Mabuchi |
| 10,755,575 B2 | 8/2020 | Johnston et al. |
| 10,757,330 B2 | 8/2020 | Ashrafi |
| 10,762,396 B2 | 9/2020 | Vallespi-Gonzalez et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao |
| 10,769,525 B2 | 9/2020 | Redding et al. |
| 10,776,109 B2 | 9/2020 | Chen et al. |
| 10,776,626 B1 | 9/2020 | Lin et al. |
| 10,776,673 B2 | 9/2020 | Kim |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi-Gonzalez et al. |
| 10,817,732 B2 | 10/2020 | Porter et al. |
| 10,819,923 B1 | 10/2020 | McCauley |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova |
| 10,832,414 B2 | 11/2020 | Pfeiffer |
| 10,832,418 B1 | 11/2020 | Karasev |
| 10,833,785 B1 | 11/2020 | O'Shea et al. |
| 10,836,379 B2 | 11/2020 | Xiao |
| 10,838,936 B2 | 11/2020 | Cohen |
| 10,839,230 B2 | 11/2020 | Charette et al. |
| 10,839,578 B2 | 11/2020 | Coppersmith, III |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al Shehri et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado Bataller et al. |
| 10,908,068 B2 | 2/2021 | Amer et al. |
| 10,908,606 B2 | 2/2021 | Stein et al. |
| 10,909,368 B2 | 2/2021 | Guo |
| 10,909,453 B1 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho |
| 10,937,186 B2 | 3/2021 | Wang et al. |
| 10,943,101 B2 | 3/2021 | Agarwal et al. |
| 10,943,132 B2 | 3/2021 | Wang et al. |
| 10,943,355 B2 | 3/2021 | Fagg et al. |
| 11,179,064 B2 | 11/2021 | Ng et al. |
| 11,562,231 B2 | 1/2023 | Iandola et al. |
| 11,983,630 B2 * | 5/2024 | Iandola .................. G06N 3/045 |
| 2003/0035481 A1 | 2/2003 | Hahm |
| 2005/0162445 A1 | 7/2005 | Sheasby et al. |
| 2006/0072847 A1 | 4/2006 | Chor et al. |
| 2006/0224533 A1 | 10/2006 | Thaler |
| 2006/0280364 A1 | 12/2006 | Ma et al. |
| 2007/0154095 A1 | 7/2007 | Cao et al. |
| 2007/0154096 A1 | 7/2007 | Cao et al. |
| 2009/0016571 A1 | 1/2009 | Tijerina |
| 2010/0118157 A1 | 5/2010 | Ushijima et al. |
| 2012/0109915 A1 | 5/2012 | Kamekawa |
| 2012/0110491 A1 | 5/2012 | Cheung |
| 2012/0134595 A1 | 5/2012 | Fonseca et al. |
| 2015/0104102 A1 | 4/2015 | Carreira |
| 2016/0132786 A1 | 5/2016 | Balan et al. |
| 2016/0283842 A1 | 9/2016 | Pescianschi |
| 2016/0328856 A1 | 11/2016 | Mannino |
| 2017/0011281 A1 | 1/2017 | Dijkman |
| 2017/0158134 A1 | 6/2017 | Shigemura |
| 2017/0206434 A1 | 7/2017 | Nariyambut Murali et al. |
| 2018/0012411 A1 | 1/2018 | Richey et al. |
| 2018/0018590 A1 | 1/2018 | Szeto et al. |
| 2018/0039853 A1 | 2/2018 | Liu |
| 2018/0067489 A1 | 3/2018 | Oder et al. |
| 2018/0068459 A1 | 3/2018 | Zhang |
| 2018/0068540 A1 | 3/2018 | Romanenko et al. |
| 2018/0074506 A1 | 3/2018 | Branson |
| 2018/0121762 A1 | 5/2018 | Han |
| 2018/0150081 A1 | 5/2018 | Gross et al. |
| 2018/0211403 A1 | 7/2018 | Hotson et al. |
| 2018/0308012 A1 | 10/2018 | Mummadi |
| 2018/0314878 A1 | 11/2018 | Lee et al. |
| 2018/0357511 A1 | 12/2018 | Misra |
| 2018/0374105 A1 | 12/2018 | Azout et al. |
| 2019/0023277 A1 | 1/2019 | Roger |
| 2019/0025773 A1 | 1/2019 | Yang et al. |
| 2019/0042894 A1 | 2/2019 | Anderson |
| 2019/0042919 A1 | 2/2019 | Peysakhovich et al. |
| 2019/0042944 A1 | 2/2019 | Nair |
| 2019/0042948 A1 | 2/2019 | Lee et al. |
| 2019/0057314 A1 | 2/2019 | Julian et al. |
| 2019/0065637 A1 | 2/2019 | Bogdoll et al. |
| 2019/0072978 A1 | 3/2019 | Dan et al. |
| 2019/0079526 A1 | 3/2019 | Vallespi-Gonzalez et al. |
| 2019/0080602 A1 | 3/2019 | Rice et al. |
| 2019/0095780 A1 | 3/2019 | Zhong et al. |
| 2019/0095946 A1 | 3/2019 | Azout et al. |
| 2019/0101914 A1 | 4/2019 | Coleman et al. |
| 2019/0108417 A1 | 4/2019 | Talagala et al. |
| 2019/0122111 A1 | 4/2019 | Min |
| 2019/0130255 A1 | 5/2019 | Yim |

(56) References Cited

U.S. PATENT DOCUMENTS

| | | |
|---|---|---|
| 2019/0145765 A1 | 5/2019 | Luo et al. |
| 2019/0146497 A1 | 5/2019 | Urtasun |
| 2019/0147112 A1 | 5/2019 | Gordon |
| 2019/0147250 A1 | 5/2019 | Zhang et al. |
| 2019/0147254 A1 | 5/2019 | Bai et al. |
| 2019/0147255 A1 | 5/2019 | Homayounfar et al. |
| 2019/0147335 A1 | 5/2019 | Wang et al. |
| 2019/0147372 A1 | 5/2019 | Luo et al. |
| 2019/0158784 A1 | 5/2019 | Ahn et al. |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari Tafti et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0235499 A1 | 8/2019 | Kazemi et al. |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzadeh et al. |
| 2019/0250640 A1 | 8/2019 | O'Flaherty et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0272446 A1 | 9/2019 | Kangaspunta et al. |
| 2019/0276041 A1 | 9/2019 | Choi et al. |
| 2019/0279004 A1 | 9/2019 | Kwon |
| 2019/0286652 A1 | 9/2019 | Habbecke et al. |
| 2019/0286972 A1 | 9/2019 | El Husseini et al. |
| 2019/0287028 A1 | 9/2019 | St. Amant et al. |
| 2019/0289281 A1 | 9/2019 | Badrinarayanan et al. |
| 2019/0294177 A1 | 9/2019 | Kwon |
| 2019/0294975 A1 | 9/2019 | Sachs |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shlens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos, Jr. et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao et al. |
| 2020/0033865 A1 | 1/2020 | Mellinger, III |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu |
| 2020/0051550 A1 | 2/2020 | Baker |
| 2020/0060757 A1 | 2/2020 | Ben-Haim |
| 2020/0065711 A1 | 2/2020 | Clément |
| 2020/0065879 A1 | 2/2020 | Hu |
| 2020/0069973 A1 | 3/2020 | Lou |
| 2020/0073385 A1 | 3/2020 | Jobanputra |
| 2020/0074230 A1 | 3/2020 | England |
| 2020/0086880 A1 | 3/2020 | Poeppel |
| 2020/0089243 A1 | 3/2020 | Poeppel |
| 2020/0089969 A1 | 3/2020 | Lakshmi Narayanan |
| 2020/0090056 A1 | 3/2020 | Singhal |
| 2020/0097841 A1 | 3/2020 | Ioannis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella |
| 2020/0117889 A1 | 4/2020 | Laput |
| 2020/0117916 A1 | 4/2020 | Liu |
| 2020/0117917 A1 | 4/2020 | Yoo |
| 2020/0118035 A1 | 4/2020 | Asawa |
| 2020/0125844 A1 | 4/2020 | She |
| 2020/0125845 A1 | 4/2020 | Hess |
| 2020/0126129 A1 | 4/2020 | Lkhamsuren |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip Leon et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo Abolfathi et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | Remine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0205697 A1 | 7/2020 | Zheng et al. |

(56) References Cited

U.S. PATENT DOCUMENTS

| | | |
|---|---|---|
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0211154 A1 | 7/2020 | Ng et al. |
| 2020/0216064 A1 | 7/2020 | Du Toit et al. |
| 2020/0218722 A1 | 7/2020 | Mai et al. |
| 2020/0218979 A1 | 7/2020 | Kwon et al. |
| 2020/0223434 A1 | 7/2020 | Campos Macias et al. |
| 2020/0225758 A1 | 7/2020 | Tang et al. |
| 2020/0226377 A1 | 7/2020 | Campos Macias et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242511 A1 | 7/2020 | Kale et al. |
| 2020/0245869 A1 | 8/2020 | Sivan et al. |
| 2020/0247433 A1 | 8/2020 | Scharfenberger et al. |
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi Mohammadabadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302299 A1 | 9/2020 | Nagel et al. |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov |
| 2020/0315708 A1 | 10/2020 | Mosnier |
| 2020/0320132 A1 | 10/2020 | Neumann |
| 2020/0324073 A1 | 10/2020 | Rajan Kesavelu Shekar et al. |
| 2020/0327192 A1 | 10/2020 | Hackman et al. |
| 2020/0327443 A1 | 10/2020 | Van Vredendaal et al. |
| 2020/0327449 A1 | 10/2020 | Tiwari et al. |
| 2020/0327662 A1 | 10/2020 | Liu et al. |
| 2020/0327667 A1 | 10/2020 | Arbel |
| 2020/0331476 A1 | 10/2020 | Chen et al. |
| 2020/0334416 A1 | 10/2020 | Vianu et al. |
| 2020/0334495 A1 | 10/2020 | Al-Rfou et al. |
| 2020/0334501 A1 | 10/2020 | Lin et al. |
| 2020/0334551 A1 | 10/2020 | Javidi |
| 2020/0334574 A1 | 10/2020 | Ishida |
| 2020/0337648 A1 | 10/2020 | Saripalli et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | McGavran et al. |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0049378 A1 | 2/2021 | Gautam et al. |
| 2021/0049455 A1 | 2/2021 | Kursun |
| 2021/0049456 A1 | 2/2021 | Kursun |
| 2021/0049548 A1 | 2/2021 | Grisz et al. |
| 2021/0049700 A1 | 2/2021 | Nguyen et al. |
| 2021/0056114 A1 | 2/2021 | Price et al. |
| 2021/0056306 A1 | 2/2021 | Hu et al. |
| 2021/0056317 A1 | 2/2021 | Golov |
| 2021/0056420 A1 | 2/2021 | Konishi et al. |
| 2021/0056701 A1 | 2/2021 | Vranceanu et al. |
| 2021/0350210 A1 | 11/2021 | Gong et al. |
| 2021/0378554 A1 | 12/2021 | Au et al. |
| 2022/0079472 A1 | 3/2022 | Au et al. |

FOREIGN PATENT DOCUMENTS

| | | |
|---|---|---|
| AU | 2021101172 A4 | 5/2021 |
| CN | 102737236 A | 10/2012 |
| CN | 103366339 A | 10/2013 |
| CN | 104835114 A | 8/2015 |

(56) References Cited

FOREIGN PATENT DOCUMENTS

| | | |
|---|---|---|
| CN | 103236037 B | 5/2016 |
| CN | 103500322 B | 8/2016 |
| CN | 106419893 A | 2/2017 |
| CN | 106504253 A | 3/2017 |
| CN | 107031600 A | 8/2017 |
| CN | 107169421 A | 9/2017 |
| CN | 107507134 A | 12/2017 |
| CN | 107885214 A | 4/2018 |
| CN | 108122234 A | 6/2018 |
| CN | 107133943 B | 7/2018 |
| CN | 107368926 B | 7/2018 |
| CN | 105318888 B | 8/2018 |
| CN | 108491889 A | 9/2018 |
| CN | 108647591 A | 10/2018 |
| CN | 108710865 A | 10/2018 |
| CN | 105550701 B | 11/2018 |
| CN | 108764185 A | 11/2018 |
| CN | 108845574 A | 11/2018 |
| CN | 108898177 A | 11/2018 |
| CN | 109086867 A | 12/2018 |
| CN | 107103113 B | 1/2019 |
| CN | 109215067 A | 1/2019 |
| CN | 109359731 A | 2/2019 |
| CN | 109389207 A | 2/2019 |
| CN | 109389552 A | 2/2019 |
| CN | 106779060 B | 3/2019 |
| CN | 109579856 A | 4/2019 |
| CN | 109615073 A | 4/2019 |
| CN | 106156754 B | 5/2019 |
| CN | 106598226 B | 5/2019 |
| CN | 106650922 B | 5/2019 |
| CN | 109791626 A | 5/2019 |
| CN | 109901595 A | 6/2019 |
| CN | 109902732 A | 6/2019 |
| CN | 109934163 A | 6/2019 |
| CN | 109948428 A | 6/2019 |
| CN | 109949257 A | 6/2019 |
| CN | 109951710 A | 6/2019 |
| CN | 109975308 A | 7/2019 |
| CN | 109978132 A | 7/2019 |
| CN | 109978161 A | 7/2019 |
| CN | 110060202 A | 7/2019 |
| CN | 110069071 A | 7/2019 |
| CN | 110084086 A | 8/2019 |
| CN | 110096937 A | 8/2019 |
| CN | 110111340 A | 8/2019 |
| CN | 110135485 A | 8/2019 |
| CN | 110197270 B | 9/2019 |
| CN | 110310264 A | 10/2019 |
| CN | 110321965 A | 10/2019 |
| CN | 110334801 A | 10/2019 |
| CN | 110399875 A | 11/2019 |
| CN | 110414362 A | 11/2019 |
| CN | 110426051 A | 11/2019 |
| CN | 110473173 A | 11/2019 |
| CN | 110516665 A | 11/2019 |
| CN | 110543837 A | 12/2019 |
| CN | 110569899 A | 12/2019 |
| CN | 110599537 A | 12/2019 |
| CN | 110599864 A | 12/2019 |
| CN | 110619282 A | 12/2019 |
| CN | 110619283 A | 12/2019 |
| CN | 110619330 A | 12/2019 |
| CN | 110659628 A | 1/2020 |
| CN | 110688992 A | 1/2020 |
| CN | 107742311 B | 2/2020 |
| CN | 110751265 A | 2/2020 |
| CN | 110751280 A | 2/2020 |
| CN | 110826566 A | 2/2020 |
| CN | 107451659 B | 4/2020 |
| CN | 108111873 B | 4/2020 |
| CN | 110956185 A | 4/2020 |
| CN | 110966991 A | 4/2020 |
| CN | 111027549 A | 4/2020 |
| CN | 111027575 A | 4/2020 |
| CN | 111047225 A | 4/2020 |
| CN | 111126453 A | 5/2020 |
| CN | 111158355 A | 5/2020 |
| CN | 107729998 B | 6/2020 |
| CN | 108549934 B | 6/2020 |
| CN | 111275129 A | 6/2020 |
| CN | 111275618 A | 6/2020 |
| CN | 111307162 B | 6/2020 |
| CN | 111326023 A | 6/2020 |
| CN | 111428943 A | 7/2020 |
| CN | 111444821 A | 7/2020 |
| CN | 111445420 A | 7/2020 |
| CN | 111461052 A | 7/2020 |
| CN | 111461053 A | 7/2020 |
| CN | 111461110 A | 7/2020 |
| CN | 110225341 B | 8/2020 |
| CN | 111488770 A | 8/2020 |
| CN | 111507952 A | 8/2020 |
| CN | 111539514 A | 8/2020 |
| CN | 111565318 A | 8/2020 |
| CN | 111582216 A | 8/2020 |
| CN | 111598095 A | 8/2020 |
| CN | 108229526 B | 9/2020 |
| CN | 111693972 A | 9/2020 |
| CN | 106558058 B | 10/2020 |
| CN | 107169560 B | 10/2020 |
| CN | 107622258 B | 10/2020 |
| CN | 111767801 A | 10/2020 |
| CN | 111768002 A | 10/2020 |
| CN | 111783545 A | 10/2020 |
| CN | 111783971 A | 10/2020 |
| CN | 111797657 A | 10/2020 |
| CN | 111814623 A | 10/2020 |
| CN | 111814902 A | 10/2020 |
| CN | 111860499 A | 10/2020 |
| CN | 111881856 A | 11/2020 |
| CN | 111882579 A | 11/2020 |
| CN | 111897639 A | 11/2020 |
| CN | 111898507 A | 11/2020 |
| CN | 111898523 A | 11/2020 |
| CN | 111899227 A | 11/2020 |
| CN | 112101175 A | 12/2020 |
| CN | 112101562 A | 12/2020 |
| CN | 112115953 A | 12/2020 |
| CN | 112132261 A | 12/2020 |
| CN | 111062973 B | 1/2021 |
| CN | 111275080 B | 1/2021 |
| CN | 112183739 A | 1/2021 |
| CN | 112232497 A | 1/2021 |
| CN | 112288658 A | 1/2021 |
| CN | 112308095 A1 | 2/2021 |
| CN | 112308799 A | 2/2021 |
| CN | 112313663 A | 2/2021 |
| CN | 112329552 A | 2/2021 |
| CN | 112348783 A | 2/2021 |
| CN | 111899245 B | 3/2021 |
| CN | 112463078 A | 3/2021 |
| CN | 112488291 A | 3/2021 |
| CN | 112686384 A | 4/2021 |
| DE | 20 2017 102 235 U1 | 5/2017 |
| DE | 20 2017 102 238 U1 | 5/2017 |
| DE | 10 2017 116 017 A1 | 1/2019 |
| DE | 10 2018 130 821 A1 | 6/2020 |
| DE | 10 2019 008 316 A1 | 8/2020 |
| EP | 1 437 004 A1 | 7/2004 |
| EP | 1 215 626 B1 | 9/2008 |
| EP | 2 179 589 A1 | 4/2010 |
| EP | 2 465 093 A1 | 6/2012 |
| EP | 2 228 666 B1 | 9/2012 |
| EP | 2 567 347 A1 | 3/2013 |
| EP | 2 420 408 B1 | 5/2013 |
| EP | 2 723 069 A1 | 4/2014 |
| EP | 2 741 253 A1 | 6/2014 |
| EP | 3 115 772 A1 | 1/2017 |
| EP | 3 185 758 A2 | 7/2017 |
| EP | 2 618 559 B1 | 8/2017 |
| EP | 3 198 557 A4 | 12/2017 |
| EP | 3 285 485 A1 | 2/2018 |
| EP | 3 295 424 A1 | 3/2018 |

(56) References Cited

FOREIGN PATENT DOCUMENTS

| | | |
|---|---|---|
| EP | 3 320 486 A1 | 5/2018 |
| EP | 3 185 758 A4 | 10/2018 |
| EP | 2 863 633 B1 | 2/2019 |
| EP | 3 113 080 B1 | 5/2019 |
| EP | 3 494 514 A1 | 6/2019 |
| EP | 3 525 132 A1 | 8/2019 |
| EP | 3 531 689 A1 | 8/2019 |
| EP | 3 535 692 A1 | 9/2019 |
| EP | 3 537 340 A1 | 9/2019 |
| EP | 3 543 917 A1 | 9/2019 |
| EP | 3 598 874 A1 | 1/2020 |
| EP | 3 608 840 A1 | 2/2020 |
| EP | 3 616 119 A1 | 3/2020 |
| EP | 3 657 387 A1 | 5/2020 |
| EP | 2 396 750 B1 | 6/2020 |
| EP | 3 664 020 A1 | 6/2020 |
| EP | 3 673 233 A1 | 7/2020 |
| EP | 3 673 233 A2 | 7/2020 |
| EP | 3 690 712 A1 | 8/2020 |
| EP | 3 690 730 A2 | 8/2020 |
| EP | 3 690 742 A1 | 8/2020 |
| EP | 3 718 048 A1 | 10/2020 |
| EP | 3 722 992 A1 | 10/2020 |
| EP | 3 729 002 A1 | 10/2020 |
| EP | 3 732 618 A1 | 11/2020 |
| EP | 3 739 486 A1 | 11/2020 |
| EP | 3 501 897 B1 | 12/2020 |
| EP | 3 751 455 A2 | 12/2020 |
| EP | 3 766 023 A1 | 1/2021 |
| EP | 3 783 527 A1 | 2/2021 |
| GB | 2 402 572 B | 8/2005 |
| GB | 2 548 087 A | 9/2017 |
| GB | 2 577 485 A | 4/2020 |
| GB | 2 517 270 B | 6/2020 |
| JP | 2578262 Y2 | 8/1998 |
| JP | 3941252 B2 | 7/2007 |
| JP | 4282583 B2 | 6/2009 |
| JP | 4300098 B2 | 7/2009 |
| JP | 2015-004922 A | 1/2015 |
| JP | 5863536 B2 | 2/2016 |
| JP | 6044134 B2 | 12/2016 |
| JP | 2019-101535 A | 6/2019 |
| JP | 6525707 B2 | 6/2019 |
| JP | 2020-101927 A | 7/2020 |
| JP | 2020-173744 A | 10/2020 |
| KR | 100326702 B1 | 3/2002 |
| KR | 101082878 B1 | 11/2011 |
| KR | 101738422 B1 | 5/2017 |
| KR | 101969864 B1 | 4/2019 |
| KR | 101996167 B1 | 7/2019 |
| KR | 102022388 B1 | 9/2019 |
| KR | 102043143 B1 | 11/2019 |
| KR | 102095335 B1 | 3/2020 |
| KR | 102097120 B1 | 4/2020 |
| KR | 10-2020-0085490 A | 7/2020 |
| KR | 10-2020-0142266 A | 12/2020 |
| KR | 102189262 B1 | 12/2020 |
| TW | 200630819 A | 9/2006 |
| TW | I294089 B | 3/2008 |
| TW | I306207 B | 2/2009 |
| WO | WO-02/052835 A2 | 7/2002 |
| WO | WO-2015/134900 A1 | 9/2015 |
| WO | WO-2016/032398 A2 | 3/2016 |
| WO | WO-2016/048108 A1 | 3/2016 |
| WO | WO-2016/207875 A1 | 12/2016 |
| WO | WO-2017/158622 A2 | 9/2017 |
| WO | WO-2017/214507 A1 | 12/2017 |
| WO | WO-2018067603 A1 * | 4/2018 ........... G06F 16/172 |
| WO | WO-2019/005547 A1 | 1/2019 |
| WO | WO-2019/067695 A1 | 4/2019 |
| WO | WO-2019/089339 A1 | 5/2019 |
| WO | WO-2019/092456 A1 | 5/2019 |
| WO | WO-2019/099622 A1 | 5/2019 |
| WO | WO-2019/122952 A1 | 6/2019 |
| WO | WO-2019/125191 A1 | 6/2019 |
| WO | WO-2019/126755 A1 | 6/2019 |
| WO | WO-2019/144575 A1 | 8/2019 |
| WO | WO-2019/182782 A1 | 9/2019 |
| WO | WO-2019/191578 A1 | 10/2019 |
| WO | WO-2019/216938 A1 | 11/2019 |
| WO | WO-2019/220436 A2 | 11/2019 |
| WO | WO-2020/006154 A2 | 1/2020 |
| WO | WO-2020/012756 A1 | 1/2020 |
| WO | WO-2020/025696 A1 | 2/2020 |
| WO | WO-2020/034663 A1 | 2/2020 |
| WO | WO-2020/056157 A1 | 3/2020 |
| WO | WO-2020/076356 A1 | 4/2020 |
| WO | WO-2020/097221 A1 | 5/2020 |
| WO | WO-2020/101246 A1 | 5/2020 |
| WO | WO-2020/120050 A1 | 6/2020 |
| WO | WO-2020/121973 A1 | 6/2020 |
| WO | WO-2020/131140 A1 | 6/2020 |
| WO | WO-2020/139181 A1 | 7/2020 |
| WO | WO-2020/139355 A1 | 7/2020 |
| WO | WO-2020/139357 A1 | 7/2020 |
| WO | WO-2020/142193 A1 | 7/2020 |
| WO | WO-2020/146445 A1 | 7/2020 |
| WO | WO-2020/151329 A1 | 7/2020 |
| WO | WO-2020/157761 A1 | 8/2020 |
| WO | WO-2020/163455 A1 | 8/2020 |
| WO | WO-2020/167667 A1 | 8/2020 |
| WO | WO-2020/174262 A1 | 9/2020 |
| WO | WO-2020/177583 A1 | 9/2020 |
| WO | WO-2020/185233 A1 | 9/2020 |
| WO | WO-2020/185234 A1 | 9/2020 |
| WO | WO-2020/195658 A1 | 10/2020 |
| WO | WO-2020/198189 A1 | 10/2020 |
| WO | WO-2020/198779 A1 | 10/2020 |
| WO | WO-2020/205597 A1 | 10/2020 |
| WO | WO-2020/221200 A1 | 11/2020 |
| WO | WO-2020/240284 A2 | 12/2020 |
| WO | WO-2020/260020 A1 | 12/2020 |
| WO | WO-2020/264010 A1 | 12/2020 |
| WO | WO-2023177319 A1 * | 9/2023 ........... G06N 3/0455 |

OTHER PUBLICATIONS

Choi et al., "PACT: Parameterized Clipping Activation for Quantized Neural Networks," Cornell University, arXiv:1805.06085v2, Jul. 17, 2018 (15 pages).

Cotton et al., "A Neural Network Implementation on an Inexpensive Eight Bit Microcontroller," INES 2008, 12th International Conference on Intelligent Engineering Systems, Feb. 25-29, 2008 (2 pages).

Cotton, Nicholas J., "A Neural Network Implementation on Embedded Systems," Dissertation, Auburn University, Alabama, USA, Aug. 9, 2010 (114 pages).

Guo et al., Software-Hardware Codesign for Efficient Neural Network Acceleration, IEEE Micro, 37:2 Mar.-Apr. 2017 (8 pages).

Jacob et al., "Quantization and Training of Neural Networks for Efficient Integer-Arithmetic-Only Inference," 2018 IEEE/CVF Conference on Computer Vision and Pattern Recognition, Jun. 18-23, 2018 (10 pages).

Li et al., "Filter Shaping for Convolutional Neural Networks," Conference Paper at ICLR 2017 (14 pages).

Machine Translation of Chinese Patent CN 115861767 A, filed Dec. 23, 2022 (8 pages).

Notice of Allowance on U.S. Appl. No. 18/156,628 dated Dec. 7, 2023 (8 pages).

Notice of Allowance on U.S. Appl. No. 18/156,628 dated Jan. 18, 2024. (8 pages).

Park et al., "Quantized Memory-Augmented Neural Networks," The Thirty-Second AAAI Conference on Artificial Intelligence (AAAI-18), 2008 (8 pages).

Qiu et al., "Going Deeper with Embedded FPGA Platform for Convolutional Neural Network," FPGA'16, Monterey, California, USA, Feb. 21-23, 2016 (10 pages).

(56) References Cited

OTHER PUBLICATIONS

US Non-Final Office Action on U.S. Appl. No. 18/156,628 dated May 12, 2023 (21 pages).

* cited by examiner

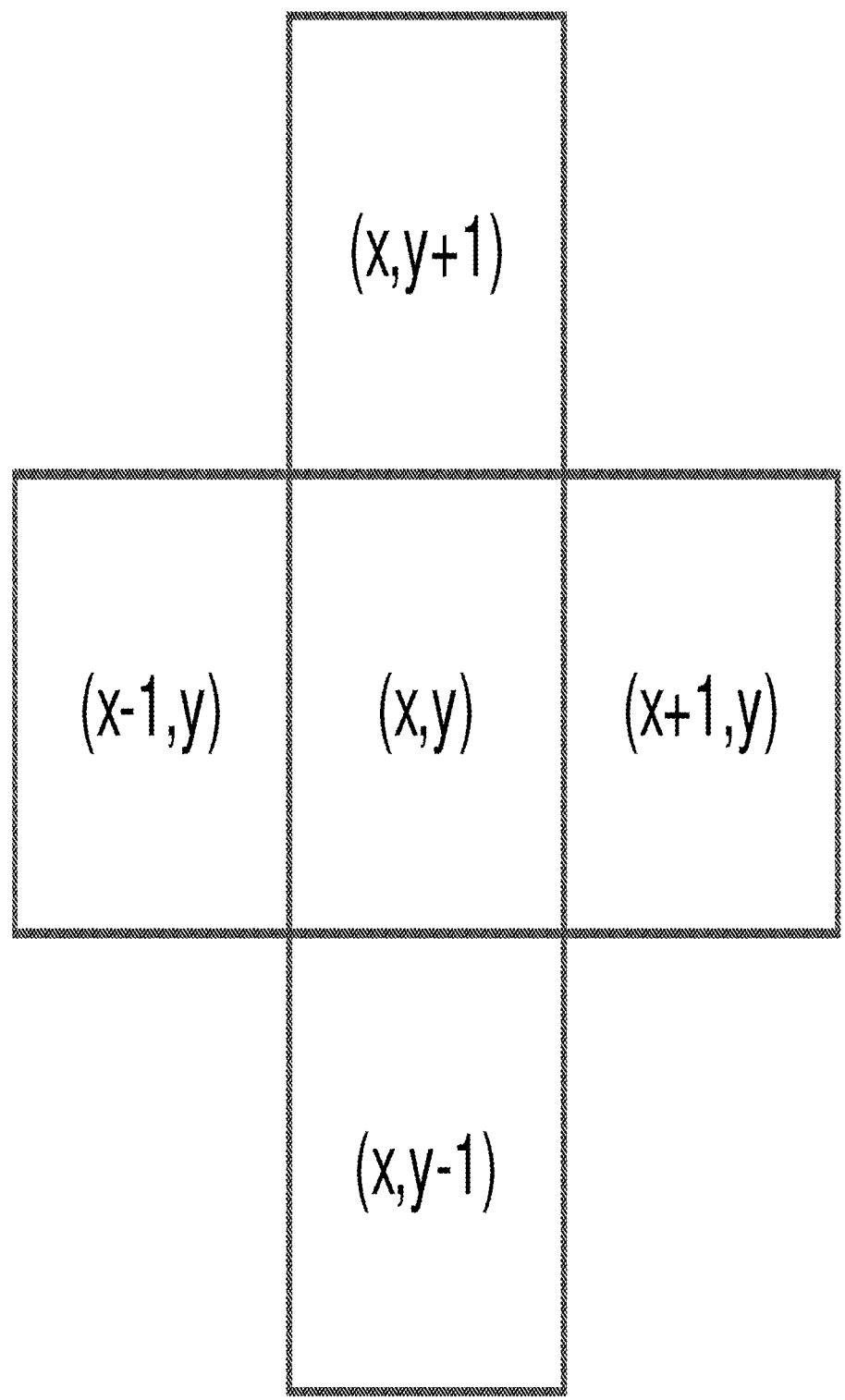
Figure 1: Star-Shaped Convolution Filter, "star-conv"

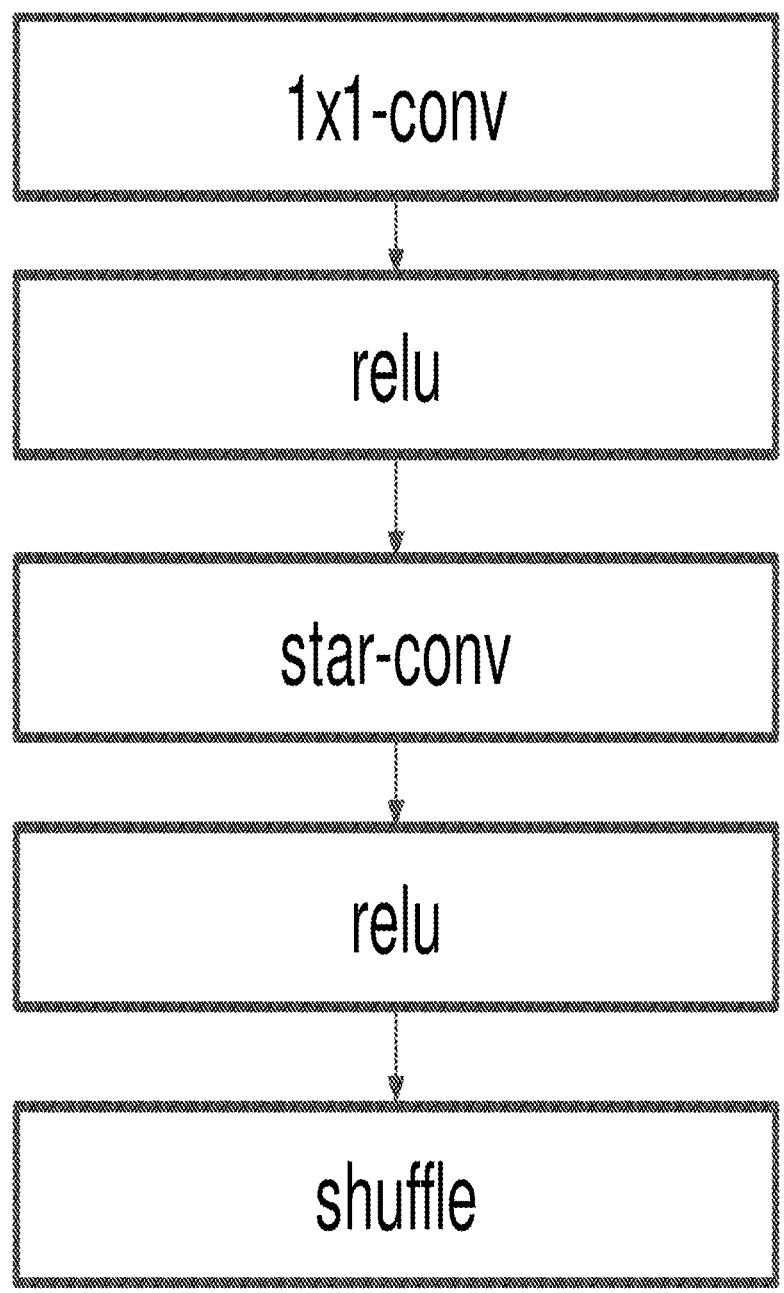
Figure 2: star-shuffle neural network block

| Repeat | Layer or block | 1x1-conv dimensions | | star-conv dimensions | | stride | Quantized Storage for 1x1-conv | | Quantized Storage for star-conv | |
|---|---|---|---|---|---|---|---|---|---|---|
| | | Group Length | Number of Filters | Group Length | Number of Filters | | Input activation storage | Weight storage | Input activation storage | Weight storage |
| 1 | star-conv | | | 3 | 16 | 2 | | | (7+s) | (4+s) |
| 1 | relu | | | | | | | | | |
| 2 | star-block | 8 | 16 | 1 | 16 | 1 | (2+s) | (2+s) | (2+s) | (3+s) |
| 1 | max-pool | | | | | 2 | | | | |
| 6 | star-block | 8 | 64 | 1 | 64 | 1 | (2+s) | (2+s) | (2+s) | (3+s) |
| 1 | max-pool | | | | | 2 | | | | |
| 12 | star-block | 16 | 256 | 1 | 256 | 1 | (4+s) | (1+s) | (2+s) | (3+s) |
| 1 | max-pool | | | | | 2 | | | | |
| 12 | star-block | 32 | 1024 | 1 | 1024 | 1 | (3+s) | (1+s) | (2+s) | (3+s) |
| 1 | average-pool | | | | | global | | | | |

Figure 3: "StarNet-A" an example StarNet deep neural network architecture $V_R$ is a real-value number $V_Q$ is a quantized number Quantization: $V_Q = \dfrac{V_R}{A} - B$ Dequantization: $V_R = A(V_Q + B)$ Figure 4: Quantization and Dequantization Equations Equation 1: $Min = A(0 + B)$ Equation 2: $Max = A((2^{bitwidth} - 1) + B)$ Figure 5: System of Equations to solve for quantization parameters A and B Quantization 1: $V_{in,Q,1} = \dfrac{V_{R,1}}{A_1} - B_1$ Dequantization 1: $V_{R,2} = A_1(V_{out,Q,1} + B_1)$ Quantization 2: $V_{in,Q,2} = \dfrac{V_{R,2}}{A_2} - B_2$ Dequantization 2: $V_{R,3} = A_2(V_{out,Q,2} + B_2)$ Collapse Dequantization 1 and Quantization 2:

Quantization: $V_{Q,1} = \dfrac{V_{R,1}}{A_1} - B_1$

Transformation: $V_{in,Q,2} = \dfrac{A_1}{A_2} V_{out,Q,1} + \dfrac{A_1 B_1}{A_2} - B_2$ Dequantization: $V_{R,3} = A_2(V_{out,Q,2} + B_2)$ Figure 6: Collapsing Adjacent Quantization Equations

NEURAL NETWORKS FOR EMBEDDED DEVICES

CROSS-REFERENCE TO RELATED APPLICATIONS

This application is a continuation of U.S. patent application Ser. No. 18/156,628 filed on Jan. 19, 2023, which is a continuation of U.S. patent application Ser. No. 16/559,483, filed on Sep. 3, 2019, which claims the benefit of U.S. Provisional Patent Application No. 62/726,396, filed Sep. 3, 2018, all of which are hereby incorporated by reference in their entirety for all purposes.

GOVERNMENT SUPPORT CLAUSE

This invention was made with government support under SBIR Phase II Grant Award No. 1758546 awarded by the National Science Foundation. The government has certain rights to the invention.

BACKGROUND

This disclosure generally relates to the deployment of deep neural networks for embedded or internet-of-things (IOT) devices.

Neural networks are often used to perform various tasks, particularly for image analysis, such as object recognition, facial recognition, or segmentation. In more typical implementations, such networks are implemented on relatively complex processors, which may include operations with a high level of precision and with significant bit-length, such as 32-bit floating point operations to multiply and sum data at various layers of a neural network. These processors may be too complex or expensive for use in inexpensive devices, such as IOT devices that may include inexpensive processors having a more limited bit-length, preventing such IOT devices from effectively implementing neural networks. In addition to reduced-bit processing, these devices may also implement reduced-bit storage, further limiting the working capacity of such devices to successfully implement neural network structures.

SUMMARY

A neural network architecture is used that reduces the processing load of implementing the neural network. This network architecture may thus be used for reduced-bit processing devices. The architecture may limit the number of bits used for processing and reduce processing to prevent data overflow at individual calculations of the neural network. To implement this architecture, the number of bits used to represent inputs at levels of the network and the related filter masks may also be modified to ensure the number of bits of the output does not overflow the resulting capacity of the reduced-bit processor. To additionally reduce the load for such a network, the network may implement a "starconv" structure that permits the incorporation of nearby nodes in a layer to balance processing requirements and permit the network to learn from context of other nodes.

BRIEF DESCRIPTION OF THE DRAWINGS

FIG. 1 illustrates the star-shaped convolution filter (starconv), according to one embodiment.

FIG. 2 illustrates the star-shuffle neural network block, according to one embodiment.

FIG. 3 illustrates an example StarNet deep neural network architecture, according to one embodiment.

FIG. 4 illustrates example equations for quantization and dequantization, according to one embodiment.

FIG. 5 illustrates example equations for determining quantization parameters, according to one embodiment.

FIG. 6 illustrates example equations for adjacent quantization equations, according to one embodiment.

Figure 7:
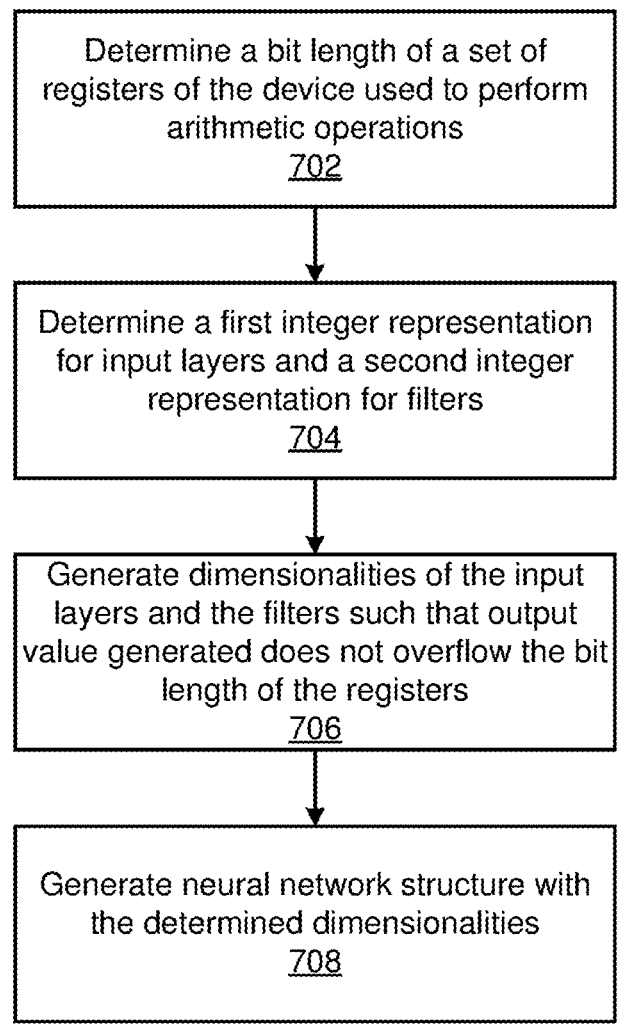
FIG. 7 illustrates an example process for generating a neural network structure including input layers and filters, according to one embodiment.

The figures depict various embodiments of the present disclosure for purposes of illustration only. One skilled in the art will readily recognize from the following discussion that alternative embodiments of the structures and methods illustrated herein may be employed without departing from the principles of the invention described herein.

DETAILED DESCRIPTION

Motivation

Computer implementations of deep neural networks (DNNs) commonly use floating-point arithmetic. As used herein, a deep neural network is a computer model that generates a set of outputs based on a set of inputs using a plurality of processing layers between the inputs and outputs. These processing layers may be "hidden" in the sense that the processing layers are not directly exposed during use, and represent arithmetic processes that together generate the set of outputs from the set of inputs. Individual nodes in these layers are typically connected by weights representing a weight of a value in a prior node that affects a current node. As an example, to process an image, the pixels of an image may be represented as an input layer. A subsequent layer may apply various filters, such as a convolutional filter, to a window of pixels in the input layer to generate values for that layer. This is often performed with floating-point arithmetic to increase precision in representing values within the network. However, low-cost and low-power computer processors (such as those used in internet-of-things devices) often do not provide support for floating-point arithmetic, and integer arithmetic must be used instead.

Further, while computer implementations of neural networks commonly use 32-bit arithmetic, low-power computer processors often run most efficiently (i.e. lowest power usage and/or highest throughput) using 8-bit arithmetic.

This presents a need for effective neural networks for use in lower-bit arithmetic and storage (e.g., 8-bit arithmetic and 8-bit storage) that is not well-addressed by existing frameworks.

Design Constraints

When the goal is to get the best tradeoff of speed, energy-efficiency, and accuracy, the optimal DNN architecture (sometimes called a "topology" or "neural structure") varies depending on the processing platform that it will be deployed on.

This disclosure relates to implementing neural network architectures on a reduced-bit architecture, which may be included reduced-bit (e.g., 8-bit) arithmetic and storage.

As one example architecture, a processing platform is a system-on-chip (SOC) that has multiple types of processing cores. Some of the cores on the SOC are general-purpose central processing unit (CPU) cores that support 8-, 16-, and 32-bit computations. But, these CPU cores are relatively slow and comparatively energy-intensive. However, the SOC also has specialized digital signal processing (DSP) cores that enable fast, energy-efficient, and highly-parallel computations. These DSP cores typically only support efficient computation of 8-bit signed integer computations. The network architecture discussed herein may be implemented on such DSP cores while rarely (or never) using the CPU cores.

The main data type supported in the DSP cores is the 8-bit signed integer.

Some processors support what is called "saturating arithmetic." In saturating arithmetic, for 8-bit signed integers, if variables X and Y are of type signed int, the maximum value of X+Y is 127. For example, if X=120 and Y=120, a saturating addition of X+Y would give the result of 127. However, with non-saturating arithmetic, X+Y typically overflows such that the result of X+Y would be −16 (i.e. negative 16). The DNN architectures discussed herein are implemented with processors using non-saturating arithmetic. Thus, overflow happens when the result exceeds the maximum value or minimum value that can be represented by the number of bits on the register that are used to perform arithmetic operations.

However, to avoid generating incorrect numerical results, the arithmetic should not overflow. This is particularly challenging when using 8-bit storage and 8-bit arithmetic. For example, multiplying large two 8-bit numbers—e.g., 125 and 126—the correct result is 15750, but the largest value representable in a signed 8-bit number is +127.

Division is an expensive arithmetic operation (requiring more computational cycles than multiplication or additions). Accordingly, effective use of an 8-bit architecture rarely or never uses division.

The bit-shift operator may be used. Bit-shift requires fewer computational cycles than division. For division by powers-of-two, the bit-shift operator can be used in place of division to produce the same results.

Elementary Components of StarNet

A family of neural network architectures, generally termed "StarNet," is disclosed to effectively implement neural networks on such reduced-bit architectures. In one embodiment, the components and processes described below may refer to or may be performed by an online system in communication with devices including reduced-bit architectures, such as internet-of-thing (IoT) devices.

To avoid overflows while performing 8-bit computations, StarNet applies the following techniques.

Neural networks commonly use convolution filters that each perform thousands of calculations (e.g. a 3×3×512 filter has 4068 elements and performs 4068 multiply-accumulate operations). The result of a 4068-element convolution will overflow with many possible input activations when computed using 8-bit arithmetic. Consider the case where the input activations consists of all ones and the filter (e.g., weights for combining prior layer values) consists of all ones (i.e. every element of the filter has a numerical value of one). The output of a convolution calculation in this example is the number 4068, which is much too large to be represented in 8-bit arithmetic and therefore would overflow and provide incorrect numerical results.

To effectively implement a neural network in reduced-bit architecture, the DNN is structured to have fewer elements per filter, such as 32 elements per filter. In one embodiment, the StarNet DNN architecture for 8-bit arithmetic and 8-bit storage has a maximum of 32 elements per filter.

Even when using a 32-element filter, 8-bit arithmetic can still overflow. For example, consider the case where the input activations consists of all ones. And, the filter consists of all fives (i.e. every element of the filter has a numerical value of five). In this case, the correct output of the convolution calculation is 160, but again the maximum representable value in an 8-bit signed integer is 127, so this overflows.

To avoid overflow, the network architecture may use various approaches to reduce the possible filter outputs within the range of the output values. The particular approach may vary, including within a given network model, based on the number of elements in the filter. In one implementation, linear quantization is used to bin floating-point values of filters and activations into a low-bit width integer representation. In one linear quantization scheme, the range of values of the linear bins is determined by analyzing the maximum and minimum numerical values that are observed in tensors of the neural network, looking at the dimensions of the filters, and then selecting maximum and minimum values for the bins such that the output cannot overflow.

In the case of a 32-element filter, input activations can be quantized to 2 bits plus the sign bit; we abbreviate this to (2+s). And, weights can be quantized to (1+s). So, the maximum value of an activation is 3 (which is the largest number representable in (2+s) arithmetic), and the maximum value of a weight is 1 (which is the largest number representable in (1+s) arithmetic). So, the largest possible output value is 32*3*1=96, which is smaller than 127 and therefore does not overflow during 8-bit arithmetic. Since values are stored in 8-bits in this example the storage of the activations and weights uses a subset of those 8 bits.

In the case of a 16-element filter, input activations are represented as (3+s), with a maximum value of 7, and weights are represented as (1+s), with a maximum value of 1. The maximum output value of this convolution is 16*7*1=112, which is less than 127 and therefore does not overflow.

In the case of an 8-element filter, input activations are represented as (2+s), with a maximum value of 3, and weights are represented as (2+s), with a maximum value of 3. The maximum output value of this convolution is 8*3*3=72, which is less than 127 and therefore does not overflow.

The 32-, 16-, and 8-element filters discussed so far are 1×1× Channels filters, where 32, 16, or 8 is the number of channels in the filter. Note that the number of channels in the input activations can be larger than the number of channels in a filter. This is accomplished using what are called group convolutions. Group convolutions have a hyperparameter called group-length. If the input activations have 1024 channels, and group-length is set to 32, then each filter will span a 32-channel subset of the 1024 input channels.

Convolutional neural networks commonly have some layers with filters of size 1×1× Channels and other layers with filters of size 3×3× Channels. In a 3×3 filter with a group-length of 1, there are 9 elements. A good representation of a 9-element convolution using (unsigned, non-saturating) 8-bit arithmetic is to represent weights as (2+s) and input activations as (2+s). In this configuration, the maximum output is 3*3*9=81.

However, with the goal of minimizing the number of elements (and thus being able to represent filters and activations with more bits), the following is a way to perform a convolution with a 2D spatial resolution while using fewer elements. Rather than a 3×3 filter, the idea is to use a "star-shaped" filter. (See FIG. 1.) Here, with respect to a pixel at location (x,y), the filter has weights that correspond with (x,y) and also with the pixels to the immediate top, bottom, left, and right of (x,y). However, unlike a traditional 3×3 convolution, a star-shaped filter may not have weights or zero out weights that correspond with the upper-left, upper-right, lower-left, and lower-right diagonal elements with respect to location (x,y). Thus, in the example shown in FIG. 1, the star-shaped filter has only 5 elements. With only 5 elements, the weights can be represented as (3+s) and the activations can be represented as (2+s). However, the star-shaped filter can generally refer to non-rectangular filters in which only a subset of elements in the filter have non-zero values or are accounted for in the neural network structure. While the example shown in FIG. 1 illustrates a star-shaped filter with a single channel, in other embodiments, each position of the star-shaped filter may be associated with additional elements along the depth of the filter that correspond to one or more channels. Henceforth, this star-shaped filter will be known as "star-conv," and 1×1× Channels filter will be known as "1×1-conv."

Note that all of the aforementioned filters have a value of group-length that is greater than 1. When a series of convolution layers have a group-length of greater than 1, what several independent neural networks may be formed that do not share data for several layers in a row because subsets of channels are processed independently for several layers. This leads to a reduction in representational power. To address this, StarNet adopts the "shuffle" layer, which interleaves the ordering of channels to enable communication across what would otherwise be a collection of independent neural networks. For example, a shuffle layer may receive a set of input values that are arranged with respect to a plurality of channels. At the shuffle layer, the neural network structure may interleave the ordering of the channels to increase representational power.

The Star-Shuffle Block

The StarNet family of DNN architectures uses a recurring block called the star-shuffle block. This block consists of the following ordering of neural network layers: {1×1-conv, relu, star-conv, relu, shuffle}.

The design of the star-shuffle block enables it to see a 2d spatial resolution (using star-conv), to mix information across nearby channels (using 1×1-conv with group-length of no more than 32), and to combine information across far-away channels (using the shuffle layer). All of this is accomplished while performing all computation using non-saturating signed 8-bit arithmetic.

Quantization Mechanism

To quantize a number from a generic 8-bit (7+s) representation to a lower-bit representation, e.g. (2+s), bins are generated as described in the section "Quantization Binning Process" below. The quantization method has a preprocessing step and a runtime step, which are described in the following.

The preprocessing step generates a set of bins that are used during the runtime step of quantization. This set of bins can be described using "quantization parameters," which describe the bins. Each layer in the neural network has two sets of quantization parameters: "activation quantization parameters" which describe the binning of input and output values of the layer, and "layer quantization parameters" which describe the binning of the parameters of the layer itself. The parameters of a particular layer may refer to the weights of filters associated with the particular layer.

Each set of bins has two processes associated with it. One is called the "quantization" process, where generic 8-bit (7+s) representations are processed into a lower-bit (2+s) representation. The other process, called the "dequantization" process, is the inverse, where the lower-bit (2+s) representation is transformed back into the 8-bit (7+s) representations. Each binning process describes its own mechanism for quantization and dequantization.

To finalize the preprocessing step, the layer parameters are binned according to the quantization process using the layer quantization parameters. These are referred to as "quantized layer parameters." For example, a filter with a set of trained weights $V_{R,weights}$ may be quantized using the equation:

$$V_{Q,weights} = \frac{V_{R,weights}}{A_{weights}} - B_{weights}$$

where $A_{weights}$ and $B_{weights}$ are the layer quantization parameters, and $V_{Q,weights}$ are the quantized layer parameters.

During runtime, each layer first applies the quantization binning process using the activation quantization parameters to its input if the input is not quantized. For example, a layer with a set of input values $V_{R,input}$ may be quantized to a quantized input using the equation:

$$V_{Q,input} = \frac{V_{R,input}}{A_{input}} - B_{input}$$

where $A_{input}$ and $B_{input}$ are the activation quantization parameters.

The parameters associated with this quantization binning process are attached to the input, and the input is fed into the layer. This layer then applies its standard operation using the quantized layer parameters. For example, using the example above, a quantized output may be generated by the equation:

$$\text{Quantized Output} = f_{V_{Q,weights}}(V_{Q,input})$$

where $f_{V_{Q,weights}}(\cdot)$ denotes an operation on the quantized input using the quantized layer parameters. For example, this may be a dot product between the filter and the quantized input.

Next, the layer applies the dequantization process using the layer quantization parameters. For example, the quantized output may first be dequantized to an output:

$$V_{R,output} = A_{weights} \cdot (\text{Quantized Output} + B_{weights}).$$

Then, the dequantization process uses the activation quantization parameters that are attached to the original input to dequantize the output. For example, the dequantization of the output may be given by:

$$\text{Dequantized Output} = A_{input} \cdot (V_{R,output} + B_{input}).$$

Quantization Binning Process

This quantization binning approach creates a set of bins implicitly based on a quantization equation and its corresponding dequantization equation, which are described by two parameters, "A" and "B" as shown in FIG. 4.

To solve for the activation quantization parameters, a dataset is passed through the neural network one example at a time and a set of output values is collected for each layer in the neural network. For each set of output values associated with a layer, the minimum and maximum output values are identified. The minimum and maximum output values are plugged into the dequantization equation, along with the selected bit-width, to produce the system of equations pictured in FIG. 5. This system of equations is solved to find the activation quantization parameters associated with each layer.

This same process occurs with the parameters of the StarNet instance being quantized. Each layer has its minimum and maximum parameter passed into the quantization equation, along with the selected bit-width, to produce the system of equations pictured in FIG. 5. This system of equations is solved to find the layer quantization parameters associated with each layer.

Optimizations can be applied to the quantization method above. In particular, we describe the "quantization collapsing" mechanism by which quantization equations for adjacent layers and activations can be collapsed into a single equation. The mathematical transformation is shown in FIG. 6, where the quantization operation of adjacent bins is collapsed, and the corresponding dequantization operations are collapsed as well. This reduces the number of operations between each quantization and dequantization by a factor of two. However, we also can leave out both of them, using only the initial quantization equation and final dequantization equation.

In various embodiments, by using maximum values that correspond to the values representable by quantized representations (e.g., a maximum value of 7 for (3+) representation), calculations such as division can be performed more often with a bit-shift operator, reducing computational complexity and time in the reduced-bit representation and execution.

StarNet Neural Network Family

Various DNNs can be formed using the star-block. As used herein, a StarNet is a DNN containing one or more star-block modules. In the following, one example implementation of a StarNet neural network architecture is described. In this example, called "StarNet-A," the DNN is tasked with ingesting an RGB image and classifying the image into one of 1024 categories. See FIG. 3 for a summary of the StarNet-A DNN architecture that is described in the following. With the exception of the first convolution layer in StarNet-A, all layers of StarNet-A can be implemented using only 8-bit arithmetic and 8-bit storage.

The first layer of StarNet-A is a star-conv layer, which is applied to an input image. While the inputs to most layers can be quantized without losing accuracy, one exception to this is that quantizing the input image does damage accuracy. Therefore, in the first layer is computed with 8-bit inputs, 16-bit arithmetic, and 16-bit temporary storage for activations. In one implementation, this first layer is computed on the CPU of an IOT system-on-chip (SOC), while all subsequent layers of StarNet-A are computed on an energy-efficient accelerator that is on the same SOC. A rectified linear unit (relu) follows the first star-conv layer, and the first star-conv layer has a stride of 2.

Next, StarNet-A has a series of 2 star-block modules, the details of which are described in FIG. 3. These star-block modules are followed by downsampling operation which is implemented using max-pooling with a stride of 2.

After that, there are 6 more star-block modules, a max-pool, 12 more star-block modules, a max-pool, and finally 12 more star-block modules. After each downsampling operation (e.g. max-pool), the number of filters is increased.

The first series of 2 star-block modules and the next series of 6 star-block modules use a group length of 8 for their 1×1-conv filters. To avoid overflow, the input activations and the weights for the 1×1-convs are represented using (2+s) bits, and these bits are contained in 128-bit outputs. The rationale for using (2+s) is: the maximum value of a (2+s) number is 3, the group length is 8, so the maximum output value is 3*3*8=72, which is smaller than 127 and therefore does not overflow when the output value is represented in 8-bits.

The next two series of 12 star-block modules have a group length of 16 and 32, respectively. Care is taken to develop a quantization scheme for these modules that does not overflow when using 8-bit storage and 8-bit arithmetic. The particular quantization scheme is shown in FIG. 3.

After the final star-block module, global average pooling is applied. This has the effect of reducing a H×W× Channels tensor of output activations down to a 1×1× Channels vector of output activations. In StarNet-A, the final star-block module has 1024 output channels, so the final output vector (after applying global average pooling) is a 1024-dimensional vector.

When running StarNet-A on an image, the largest of the 1024 output channels is the category that StarNet-A predicts is contained in the image.

In an other implementation, the final layers of StarNet-A can be configured to produce an activation grid that represents a semantic segmentation mask of a whole image.

In an other implementation, the input to StarNet-A includes a depth map.

FIG. 7 illustrates an example process for generating a neural network structure including input layers and filters, according to one embodiment. The online system determines 702 a bit length of a set of registers of the device used to perform arithmetic operations. For example, the registers may have an 8-bit architecture. The online system determines 704 a first integer representation for one or more input layers of the neural network structure and a second integer representation for one or more filters. The first integer representation may be associated with a first range of integer values and the second integer representation may be associated with a second range of integer values. Thus, each element in the input layers when quantized, may have a minimum to maximum range of integer values defined by the first integer representation. Similarly, each element in the filters when quantized, may have a minimum to maximum range of integer values defined by the second integer representation.

The online system generates 706 dimensionalities of the one or more input layers and the one or more filters. The dimensionalities are determined such that an output value generated by combining elements of an input layer as maximum values of the first integer representation with elements of a corresponding filter as maximum values of the second integer representation does not overflow the bit length of the set of registers. The online system generates 708 the neural network structure with the determined dimensionalities.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Terminology

"Output Activation": The output data produced by a layer of a deep neural network.
"Input Activation": The input data provided to a layer of a deep neural network.
"Weight": A learned parameter in a DNN.
"Filter": A collection of weights organized in a specific pattern (e.g. a 3×3×256 convolution filter).
"Group-Length": The number of channels in a convolution filter.

What is claimed is:

1. A method of generating a neural network structure including one or more input layers each associated with one or more filters, the method comprising:
determining, for an architecture of a device, a bit length of a set of registers of the device used to perform arithmetic operations;
determining a first integer representation for the one or more input layers and a second integer representation for the one or more filters, the first integer representation associated with a first range of integer values and the second integer representation associated with a second range of integer values;
generating dimensionalities of the one or more input layers and the one or more filters, the dimensionalities determined such that an output value generated by combining elements of an input layer as maximum values of the first integer representation with elements of a corresponding filter as maximum values of the second integer representation does not overflow the bit length of the registers; and
generating the neural network structure with the determined dimensionalities, wherein for at least one layer which forms the neural network structure, an activation is quantized using an activation parameter for the at least one layer and a weight is quantized using a layer parameter for the at least one layer.

2. The method of claim 1, wherein generating the dimensionalities comprises generating the one or more filters for a corresponding input layer as star-shaped filters.

3. The method of claim 1, further comprising:
receiving a set of input values corresponding to the elements of an input layer in the one or more input layers, and a set of weights corresponding to the elements of a filter in the one or more filters with the generated dimensionalities;
quantizing the set of input values by assigning each input value to a corresponding integer value in the first integer representation;
quantizing the set of weights by assigning each weight to a corresponding integer value in the second integer representation; and
combining the set of input values and the set of weights to generate a quantized output.

4. The method of claim 3, wherein the neural network structure includes a shuffle layer placed after the corresponding input layer, the method further comprising:
receiving another set of input values at the shuffle layer, wherein the another set of input values are arranged with respect to a plurality of channels; and
interleaving ordering of the plurality of channels at the shuffle layer.

5. The method of claim 3, wherein quantizing the set of input values comprises:
obtaining a dataset including a plurality of data instances;
propagating the plurality of data instances through the neural network structure to obtain input values at the input layer;
identifying a lower bound value and an upper bound value from the input values obtained at the input layer; and
dividing a range between the lower bound value and the upper bound value into a plurality of bins each assigned to a corresponding integer value in the first integer representation.

6. The method of claim 3, wherein quantizing the set of weights comprises:
identifying a lower bound value and an upper bound value from the set of weights; and
dividing a range between the lower bound value and the upper bound value into a plurality of bins each assigned to a corresponding integer value in the second integer representation.

7. The method of claim 1, wherein the bit length of the set of registers are 8 bits, and the arithmetic operations are performed using 8-bit arithmetic.

8. A non-transitory computer-readable medium containing instructions for execution on a processor, the instructions comprising:
   determining, for an architecture of a device, a bit length of a set of registers of the device used to perform arithmetic operations;
   determining a first integer representation for the one or more input layers and a second integer representation for the one or more filters, the first integer representation associated with a first range of integer values and the second integer representation associated with a second range of integer values;
   generating dimensionalities of the one or more input layers and the one or more filters, the dimensionalities determined such that an output value generated by combining elements of an input layer as maximum values of the first integer representation with elements of a corresponding filter as maximum values of the second integer representation does not overflow the bit length of the registers; and
   generating the neural network structure with the determined dimensionalities, wherein for at least one layer which forms the neural network structure, an activation is quantized using an activation parameter for the at least one layer and a weight is quantized using a layer parameter for the at least one layer.

9. The non-transitory computer-readable medium of claim 8, wherein generating the dimensionalities comprises generating the one or more filters for a corresponding input layer as star-shaped filters.

10. The non-transitory computer-readable medium of claim 8, the instructions further comprising:
    receiving a set of input values corresponding to the elements of an input layer in the one or more input layers, and a set of weights corresponding to the elements of a filter in the one or more filters with the generated dimensionalities;
    quantizing the set of input values by assigning each input value to a corresponding integer value in the first integer representation;
    quantizing the set of weights by assigning each weight to a corresponding integer value in the second integer representation; and
    combining the set of input values and the set of weights to generate a quantized output.

11. The non-transitory computer-readable medium of claim 10, wherein the neural network structure includes a shuffle layer placed after the corresponding input layer, the instructions further comprising:
    receiving another set of input values at the shuffle layer, wherein the another set of input values are arranged with respect to a plurality of channels; and
    interleaving ordering of the plurality of channels at the shuffle layer.

12. The non-transitory computer-readable medium of claim 10, wherein quantizing the set of input values comprises:
    obtaining a dataset including a plurality of data instances;
    propagating the plurality of data instances through the neural network structure to obtain input values at the input layer;
    identifying a lower bound value and an upper bound value from the input values obtained at the input layer; and
    dividing a range between the lower bound value and the upper bound value into a plurality of bins each assigned to a corresponding integer value in the first integer representation.

13. The non-transitory computer-readable medium of claim 10, wherein quantizing the set of weights comprises:
    identifying a lower bound value and an upper bound value from the set of weights; and
    dividing a range between the lower bound value and the upper bound value into a plurality of bins each assigned to a corresponding integer value in the second integer representation.

14. The non-transitory computer-readable medium of claim 8, wherein the bit length of the set of registers are 8 bits, and the arithmetic operations are performed using 8-bit arithmetic.

15. A system comprising:
    a processor configured to execute instructions;
    a computer-readable medium containing instructions for execution on the processor, the instructions causing the processor to perform steps of:
        determining, for an architecture of a device, a bit length of a set of registers of the device used to perform arithmetic operations;
        determining a first integer representation for the one or more input layers and a second integer representation for the one or more filters, the first integer representation associated with a first range of integer values and the second integer representation associated with a second range of integer values;
        generating dimensionalities of the one or more input layers and the one or more filters, the dimensionalities determined such that an output value generated by combining elements of an input layer as maximum values of the first integer representation with elements of a corresponding filter as maximum values of the second integer representation does not overflow the bit length of the registers; and
        generating the neural network structure with the determined dimensionalities, wherein for at least one layer which forms the neural network structure, an activation is quantized using an activation parameter for the at least one layer and a weight is quantized using a layer parameter for the at least one layer.

16. The system of claim 15, wherein generating the dimensionalities comprises generating the one or more filters for a corresponding input layer as star-shaped filters.

17. The system of claim 15, the instructions further comprising:
    receiving a set of input values corresponding to the elements of an input layer in the one or more input layers, and a set of weights corresponding to the elements of a filter in the one or more filters with the generated dimensionalities;
    quantizing the set of input values by assigning each input value to a corresponding integer value in the first integer representation;
    quantizing the set of weights by assigning each weight to a corresponding integer value in the second integer representation; and
    combining the set of input values and the set of weights to generate a quantized output.

18. The system of claim 17, wherein the neural network structure includes a shuffle layer placed after the corresponding input layer, the instructions further comprising:

receiving another set of input values at the shuffle layer, wherein the another set of input values are arranged with respect to a plurality of channels; and interleaving ordering of the plurality of channels at the shuffle layer.

19. The system of claim 17, wherein quantizing the set of input values comprises:

obtaining a dataset including a plurality of data instances;

propagating the plurality of data instances through the neural network structure to obtain input values at the input layer;

identifying a lower bound value and an upper bound value from the input values obtained at the input layer; and dividing a range between the lower bound value and the upper bound value into a plurality of bins each assigned to a corresponding integer value in the first integer representation.

20. The system of claim 15, wherein the bit length of the set of registers are 8 bits, and the arithmetic operations are performed using 8-bit arithmetic.

* * * * *